(12) United States Patent
Brocke et al.

(10) Patent No.: US 12,520,769 B2
(45) Date of Patent: Jan. 13, 2026

(54) METHOD, CONTROL DEVICE AND COMPACTING VEHICLE FOR COMPACTING HARVESTED CROPS IN A SILO

(71) Applicant: DEERE & COMPANY, Moline, IL (US)

(72) Inventors: Stefan Brocke, Mannheim (DE); Norbert Fritz, Ilvesheim (DE)

(73) Assignee: Deere & Company, Moline, IL (US)

( * ) Notice: Subject to any disclaimer, the term of this patent is extended or adjusted under 35 U.S.C. 154(b) by 418 days.

(21) Appl. No.: 17/184,757

(22) Filed: Feb. 25, 2021

(65) Prior Publication Data

US 2021/0321571 A1 Oct. 21, 2021

(30) Foreign Application Priority Data

Apr. 15, 2020 (DE) .......................... 102020110297.6

(51) Int. Cl.
*A01F 25/18* (2006.01)
*A01B 69/00* (2006.01)
*A01F 25/16* (2006.01)

(52) U.S. Cl.
CPC .......... *A01F 25/183* (2013.01); *A01B 69/004* (2013.01); *A01F 25/166* (2013.01)

(58) Field of Classification Search
CPC ...... A01F 25/18; A01F 25/183; A01F 25/186; A01F 25/166; A01B 59/066; A01B 63/111; A01B 69/004
See application file for complete search history.

(56) References Cited

U.S. PATENT DOCUMENTS

| | | | | |
|---|---|---|---|---|
| 2,788,247 A | * | 4/1957 | Chapman | A01F 25/2009 414/322 |
| 5,499,685 A | * | 3/1996 | Downing, Jr. | A01C 5/062 111/140 |
| 5,735,195 A | * | 4/1998 | Hewitt | B30B 9/3082 100/65 |
| 2012/0125244 A1 | * | 5/2012 | Beaujot | A01B 79/005 111/149 |
| 2020/0359559 A1 | * | 11/2020 | Koch | A01C 7/205 |

FOREIGN PATENT DOCUMENTS

| | | |
|---|---|---|
| DE | 19922867 A1 | 11/2000 |
| DE | 102007053610 A1 | 5/2009 |
| DE | 102020110297 A1 | 10/2021 |

(Continued)

OTHER PUBLICATIONS

Machine translation of EP 3 403 487 A1, 10 pages (Year: 2025).*
European Search Report issued in European Patent Application No. 21160760.1, dated Jul. 27, 2021, 7 pages.

*Primary Examiner* — Jimmy T Nguyen
(74) *Attorney, Agent, or Firm* — Taft Stettinius & Hollister LLP; Stephen F. Rost

(57) ABSTRACT

A method for compacting silage in a silo includes controlling a compacting vehicle via an electronic control device, passing over the silage deposited in the silo with the compacting vehicle, exerting a compacting action along a compacting path via the compacting vehicle, and varying the compacting action of the compacting vehicle in a location-dependent manner along the compacting path by the action of the control device.

7 Claims, 3 Drawing Sheets

(56) References Cited

FOREIGN PATENT DOCUMENTS

| EP | 2387867 | A1 | * | 11/2011 | ........... | A01F 25/166 |
| EP | 3348130 | A1 | | 7/2018 | | |
| EP | 3384746 | A1 | | 10/2018 | | |
| EP | 3403487 | A1 | | 11/2018 | | |
| EP | 3403488 | A1 | | 11/2018 | | |

* cited by examiner

METHOD, CONTROL DEVICE AND COMPACTING VEHICLE FOR COMPACTING HARVESTED CROPS IN A SILO

RELATED APPLICATIONS

This application claims priority to German Application No. 102020110297.6, filed Apr. 15, 2020, the disclosure of which is hereby expressly incorporated by reference in its entirety.

FIELD OF THE DISCLOSURE

The present disclosure relates to a method for compacting harvested crops in a silo, and an electronic control unit for controlling a compacting vehicle and a compacting vehicle provided therewith.

BACKGROUND

Silage is a type of fodder which is produced from green foliage plants which are stored in a silo and stabilized by acidification. The acidification takes place by fermentation. The finished silage may be fed to cows, sheep and other ruminants. The storage and fermentation process is denoted as silaging and is carried out by using whole grass plants (not only the seed heads), such as maize, sorghum or other cereals.

In some countries (for example, North America, Australia, northwestern Europe and New Zealand) it is usual to deposit the silage in large heaps on the ground and to drive over the silage with a tractor in order to force out the air and then to cover it with plastic sheeting which is fixed by used tires or tire ring walls. In other countries (for example, northern Europe) for unloading the silage so-called bunker silos, which comprise a base and lateral walls made of concrete or other materials (for example, rail sleepers), are used. In this case, the compacting and sealing are also carried out by sheeting which is fixed by tires.

In the past, the fermentation was carried out by indigenous micro-organisms; but nowadays the silage is supplied with ensilage agents in which specific micro-organisms are contained in order to accelerate the fermentation or to improve the silage. Ensilage agents may contain one or more strains of lactic acid bacteria, generally *Lactobacillus plantarum*. Other bacteria used include the species *Lactobacillus buchneri, Enterococcus faecium* and *Pediococcus*.

The silage stored and covered in the silo is accordingly subjected to an anaerobic fermentation, which starts approximately 48 hours after filling the silo and converts sugars contained in the plants into acids. The fermentation is substantially terminated after approximately 2 weeks. Before the anaerobic fermentation starts, there is an aerobic phase in which the oxygen contained in the silage is consumed. The packing density of the fodder determines the quality of the silage obtained since via the atmospheric oxygen component it influences the chemical reactions occurring in the silo.

If the fodder is well compacted, the supply of oxygen is limited and the resulting acid-based fermentation causes a decomposition of the carbohydrates present into acetic acid, butyric acid and lactic acid. Such a silage product is denoted as sour silage. If, however, on the other hand the fodder is not well compacted or loosely deposited or the silo is only filled gradually, the oxidation takes place more rapidly and the temperature rises. In these cases, the penetrating oxygen of the air may lead to the production of ammonia or butyric acid and in the worst case the silage may become toxic and may no longer be used as animal fodder. If the fermentation process is not carefully carried out and controlled, therefore, the sour silage takes on an unpleasant odor by excessive production of ammonia or butyric acid (the latter is responsible for the odor of rancid butter). For the production of high quality silage accordingly it is important to compact the fodder sufficiently well in order to avoid the negative effect of oxygen pockets.

An automation of the compacting is proposed in the prior art. In EP 3 403 487 A1, a method for filling a silo with harvested crops is disclosed, in which the harvested crops are initially distributed in the silo and are subsequently compacted by an autonomously operating machine. This machine is controlled using the level of the piled-up harvested crops and the compacting attained thereby, and using the dry mass, cut length and moisture of the harvested crops such that a desired compacting is attained.

An automatic compacting of silage is also disclosed in EP 3 403 488 A1. Here a degree of compacting to be attained is determined as a function of a parameter of the working machine used for the compacting, a parameter of the harvested crops and the number of compacting cycles carried out, and based thereon the number of compacting cycles still to be carried out. This method may also be carried out in a location-specific manner, i.e., on individually defined surface segments of the surface to be compacted. Thus, a specific surface segment is no longer compacted when the intended compacting is achieved, since then a different track is traveled over.

In the methods disclosed in EP 3 403 487 A1 and EP 4 403 488 A1, the compacting vehicle is moved at uniform velocity over time (apart from changes to the direction of movement) and with a uniform compacting action (contact force) over the silage. However, in order to adapt to a desired degree of compacting, the compacting time, i.e., the number of processes in which the compacting vehicle is moved over the silage, is varied, which in EP 3 403 488 A1 may be also selected to be variable for different tracks depending on the compacting attained.

In reality, however, silage piles are not uniform over their entire surface, neither regarding the height (generally it is highest in the middle) nor regarding the properties of the harvested crops. The chronologically uniform compacting action of the compacting machine used in the prior art, therefore, has the result that some regions of the silo are still passed over and compacted although this might no longer be necessary, since other regions still have to be compacted. As a result, therefore, more energy and working time is required for the compacting than might be necessary.

SUMMARY

According to the present disclosure, a method for compacting silage in a silo, in which a compacting vehicle under the control of an electronic control device passes over the silage deposited in the silo, exerting a compacting action along a compacting path, comprises that the compacting action of the compacting vehicle is varied in a location-dependent manner along the compacting path by the action of the control device.

In other words, the compacting action of the compacting vehicle is controlled in a location-dependent manner on its compacting path over the silage (generally traveled over repeatedly—for a number of passes fixed in advance or retrospectively using the compacting attained), for example, depending on local properties of the silage, in order to adapt the compacting action to the local properties of the silage. In this manner, the aforementioned drawbacks are avoided.

For varying the compacting action, the velocity of the compacting vehicle or the pressure exerted by the compacting vehicle on the silage may be varied. The pressure exerted by the compacting vehicle may be varied by adjusting the tire pressure of the compacting vehicle or adjusting the contact force of a compacting tool, for example, by an actuator for adjusting the position of a lower link arm or the length of an upper link arm or lower link arm of a three-point hitch.

The compacting action may be fixed using properties of the silage. Using the properties of the silage a density of the silage to be attained may be determined and used for determining the compacting action to be applied for achieving the density of the silage to be attained. For fixing the compacting action, one or more of the following properties of the silage may be used: location-specific thickness of the layer of the silage to be compacted, moisture of the silage, type of plants contained in the silage and the cut length thereof.

The attained compacting of the silage may be detected and used for controlling the compacting action, whether in the sense of terminating the compacting when the desired compacting action is attained or for changing the compacting action depending on the compacting attained. In a further embodiment, in which feedback to the control device of the attained compacting is not required, the compacting action is fixed in advance and not checked by measuring the attained compacting. Without feedback by measuring the compacting, the attained compacting is estimated on the basis of the location-dependent compacting performance already applied and the location-dependent material present (layer thickness, moisture, cut length).

The control unit may control the compacting action directly or via a user interface.

An electronic control device for controlling a compacting vehicle for compacting silage in a silo, which is designed to pass over the silage deposited in the silo under the control of the electronic control device, exerting a compacting action along a compacting path, may be configured to vary the compacting action of the compacting vehicle along the compacting path in a location-dependent manner.

BRIEF DESCRIPTION OF THE DRAWINGS

The above-mentioned aspects of the present disclosure and the manner of obtaining them will become more apparent and the disclosure itself will be better understood by reference to the following description of the embodiments of the disclosure, taken in conjunction with the accompanying drawing, wherein.

Corresponding reference numerals are used to indicate corresponding parts in the drawings.

DETAILED DESCRIPTION

The embodiments of the present disclosure described below are not intended to be exhaustive or to limit the disclosure to the precise forms disclosed in the following detailed description. Rather, the embodiments are chosen and described so that others skilled in the art may appreciate and understand the principles and practices of the present disclosure.

Figure 1:
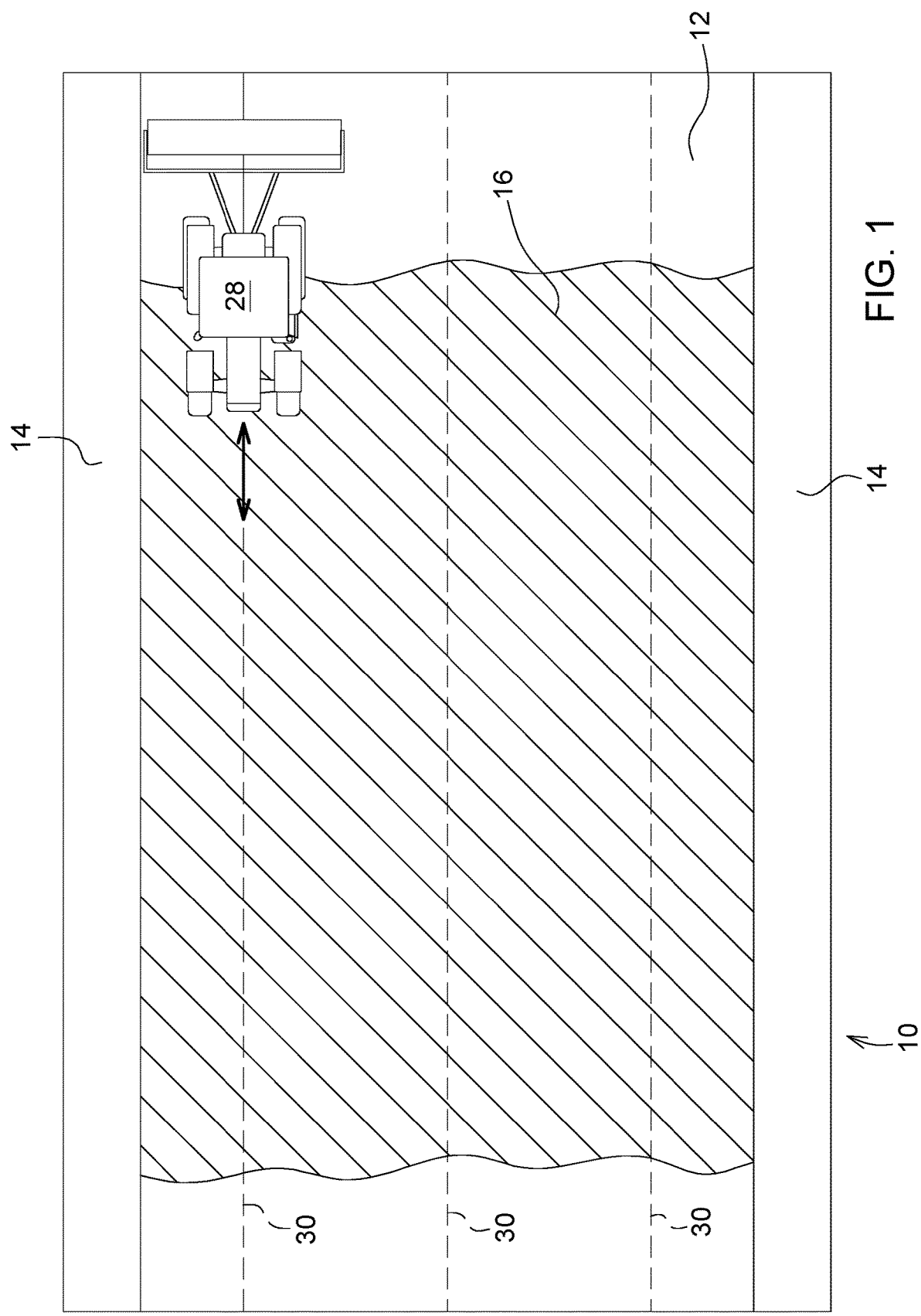
FIG. 1 shows a plan view of a silo with a compacting vehicle operating therein.

In FIG. 1, a silo 10 in the form of a so-called bunker silo is shown. The silo comprises a base 12 and lateral walls 14 which are generally all produced from concrete. The silo 10 is designed as a trench silo into which chopped foliage plants are introduced, distributed and compacted, as known in the prior art (EP 3 403 487 A1, EP 3 403 488 A1, the entire disclosure thereof being incorporated by way of reference in the present documentation) and therefore is open to the left and right. The foliage plants may be harvested by a harvesting chain 20 which consists of a harvesting vehicle 22 in the form of a forage harvester and a traction vehicle 24 with a trailer 26, as shown schematically in FIG. 2. The harvested crops are directly discharged from the trailer 26 onto the silo 10 or initially deposited in a pile in the vicinity thereof and distributed on the silo 10 by a suitable vehicle or other means. A further embodiment of a harvesting chain, not shown in the drawings, which in particular is suitable for grass harvesting, may comprise a tractor and a loading vehicle towed thereby. The harvested crops are then compacted by a compacting vehicle 28 which is moved along traveled paths 30 over the silo 10. In FIG. 1 it is assumed that the compacting vehicle 28 moves a relatively broad compacting device 36 (see FIG. 2) which has a relatively large working width, so that only three traveled paths 30 are illustrated here. If a compacting device 36 is not used but the compacting is carried out only by the wheels 40, 42 of the compacting vehicle 28, naturally substantially more traveled paths 30 have to be covered.

The chopped foliage plants, denoted hereinafter as silage 16, may be supplied with an ensilage agent during harvesting or during or after storage, in order to improve the fermentation. Additionally, after the compacting the silage 16 is covered at the top and toward the open sides of the silo 10 with a film in order to shield the silage from the oxygen of the surrounding air.

Figure 2:
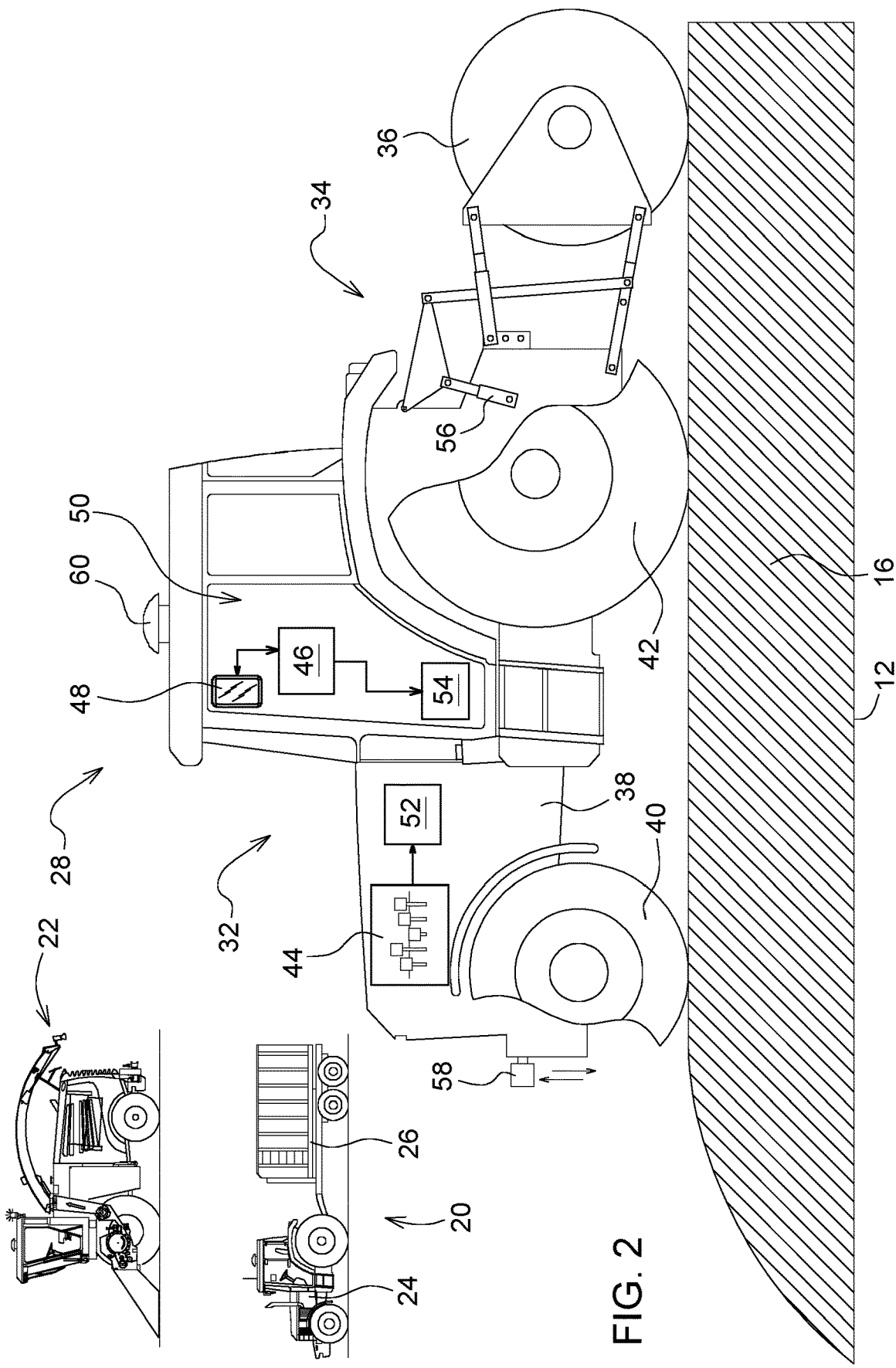
FIG. 2 shows a lateral view of the silo of FIG. 1 and a harvesting chain.

The compacting vehicle 28 is shown in more detail in FIG. 2. The compacting vehicle is composed of a tractor 32 and a compacting device 36 in the form of a roller attached to its three-point hitch 34. The compacting device 36 could also be dispensed with or be replaced by a ballast weight. The compacting is carried out in this case by the wheels 40, 42 of the compacting vehicle 28. Instead of a tractor 32 also a road roller or any other vehicle, for example, a snow groomer, could be used as a compacting vehicle 28.

The tractor 32 comprises a load bearing chassis 38 which is supported on steerable front wheels 40 and drivable rear wheels 42, which are drive-connected in a torque-proof manner to the crankshaft of an internal combustion engine 44. An electronic control device 46 (the computing power thereof also being able to be outsourced, whether to a remote stationary computer or a computer designed as a mobile device, for example, of the user, or the Cloud) is connected to a user interface 48 which is assigned to the work place of a user in a cab 50. The control device 46 is also connected in a signal-transmitting manner to an automatic steering and speed control device 52, a tire pressure regulator 54 and an actuator 56 (power lift) for adjusting the position of the lower link arm of the three-point hitch 34 and is configured to control this automatically. By the actuator 56, the contact force of the compacting device 36 may be varied and the compacting device lifted away.

When storing the silage 16, for the purpose of the compacting thereof the compacting vehicle 28 is moved along the traveled paths 30, i.e., to and fro parallel to the side walls 14 of the silo 10, wherein a traveled path 30 is traveled over until the silage 16 located on the respective traveled path 30 is sufficiently compacted and then a further traveled path 30 is traveled over. It might also be conceivable to travel over all of the traveled paths 30 once or repeatedly in succession until the desired compacting is achieved on one traveled path and finally all of the traveled paths 30. In particular, when no compacting device 36 is attached to the compacting vehicle 28, the compacting is carried out along different traveled paths 30 from those shown in FIG. 1. Moreover, the compacting device 36 does not have to compact evenly and simultaneously over its entire width, which leads to additional traveled paths 30 having to be covered (relative to the situation shown in FIG. 1) in order to attain the desired resulting compacting action for the whole of the silage 16. Subsequently, a layer of new silage 16 is applied and compacted again until the silo 10 is filled. In a further method, however, it might also be possible to fill the silo 10 gradually in the horizontal direction and to compact the silage only when the silo is filled up. A combination of the two methods is also conceivable.

Figure 3:
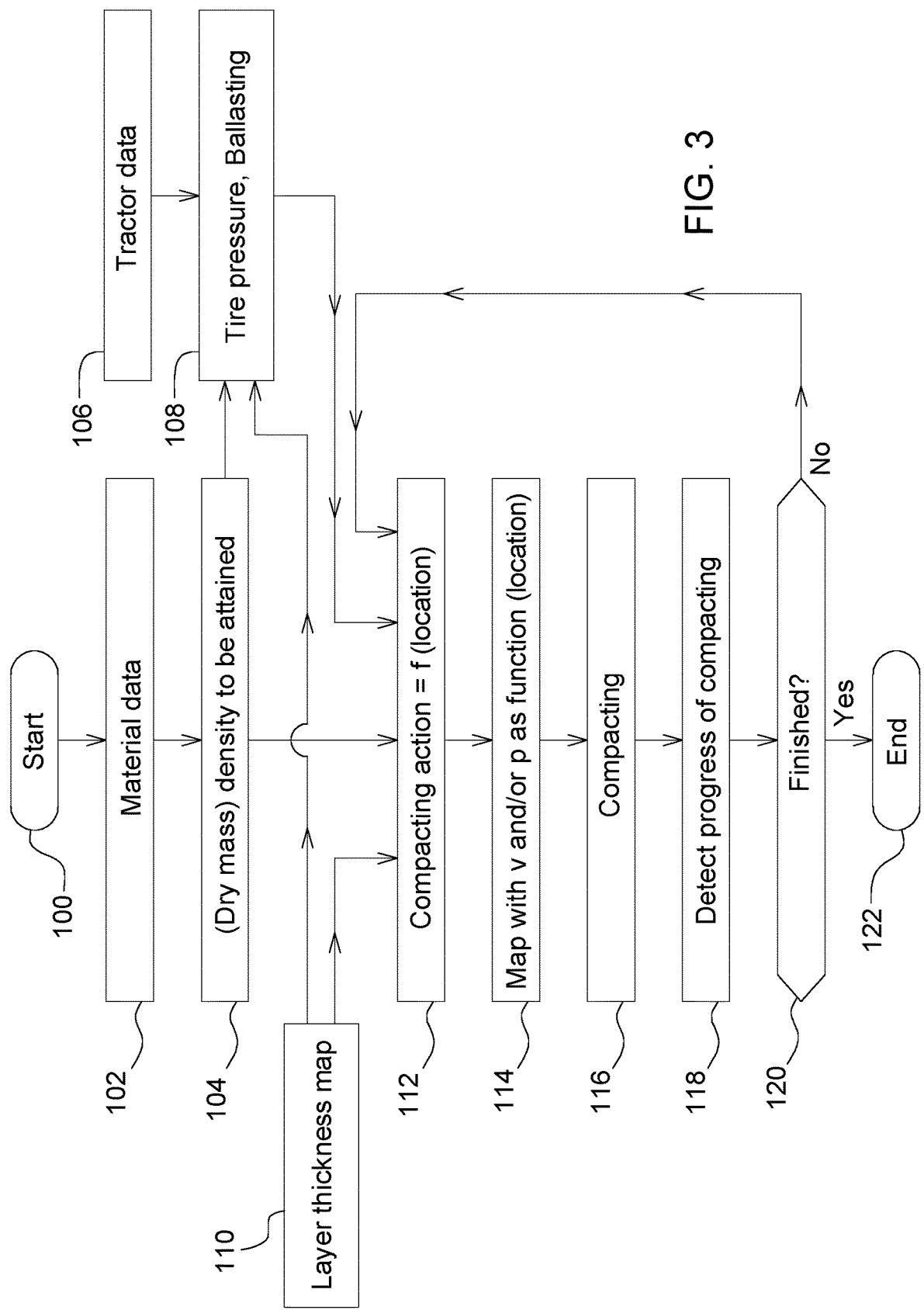
FIG. 3 shows a flow diagram according to which a control device of the compacting vehicle operates.

Reference is now made to FIG. 3 in which the mode operation of the control device 46 of the compacting vehicle 28 during the compacting is shown in detail.

After the start in step 100, step 102 follows, in which material data are detected and supplied to the electronic control device 46 which is provided with a memory and a processor. The material data relate to properties of the silage 16 which may be collected by sensors on-board the harvesting vehicle 22. The properties are, in particular, the moisture (which, for example, may be measured with a near-infrared spectrometer see DE 199 22 867 A1), a predetermined target or measured actual value of the cut length and the type of harvested crops input by a user of the harvesting vehicle 22 or the compacting vehicle 28 or automatically identified, (for example, whether it is maize (whole plant silage or seed heads) or grass) and the mass or the volume of a filling of the trailer 26, which may be determined on the part of the harvesting vehicle 22 using the highly integrated throughput or on the part of the trailer 26 by weighing. The data detected on the part of the harvesting vehicle 22 may be transmitted wirelessly (for example, via a mobile radio connection) or via a memory assigned to the traction vehicle 24 or trailer 26 to the control device 46, for example, via near-field communication or an RFID protocol. Generally, average values of the moisture and the cut length are used here. If one of the measured values should be subjected to an unexpected variation, the usual methods for correction may be used, for example, by anomalies being ignored. The material data, primarily regarding the moisture, could possibly also be measured by a corresponding sensor on the compacting vehicle 28 which may be provided there in addition to the sensor 58, or a manual measurement is carried out by an operator with a suitable sensor, the measured value thereof being supplied to the control device 46.

In step 104, a density of the silage 16 to be attained at the end of the compacting process by the compacting vehicle 28 is calculated by the control device 46 using the material data. In this case, in particular, a so-called dry mass density may be calculated, i.e., the quantity of dry mass of the silage 16 (measured in weight or mass units such as N or kg) relative to (divided by) the associated volume of the silage 16.

In step 106, data regarding the tractor 28 may be read from the memory of the control device 46. This data refers to physical properties of the compacting vehicle 28 designed as a tractor 32, such as mass, tire size and the pressure range which may be set by the tire pressure regulator 54 in the tires of the front and rear wheels 40, 42 and—when a compacting device 36 is present—data of the compacting device (mass and dimensions).

In step 110, the thickness (vertical dimension) of the layer of silage 16 to be compacted is evaluated. To this end, data which has been obtained during the distribution of the silage 16 in the silo 10 may be used, i.e., setting data or measured data of a distribution machine which has distributed the silage 16, for example, regarding the level of a pusher blade by which the silage 16 is pushed and distributed over the silo. Further, a measurement of the thickness of the layer of silage 16 to be compacted may be carried out by a suitable sensor 58 of the compacting vehicle 28 which operates, for example, using radar waves. Using its known individual position and a time-based measurement of the distance from the position at which the radiated waves are reflected through a lower, already compacted layer or (if a compacted layer were not yet present) from the base 12, the sensor 58 may identify the thickness of the layer. This sensor 58 may also detect the density of the silage 16. The sensor 58, as shown in FIG. 2, may be attached to the front face of the compacting vehicle 28 or at any other position or to any other vehicle or held by hand in order to detect the thickness or density of the layer to be measured. This data is detected in a location-specific manner, a satellite-assisted position determining system 60 being able to be used therefor.

Further to the described method, the layer thickness may be detected by a stereo camera fastened to the compacting vehicle 28 or also a plurality of fixed cameras could observe the silo by the camera continuously scanning the level of the surface relative to fixed points (even during compacting) and then rescanning during the distribution and the difference being formed. It also might be possible to create the layer thickness using a position determining system such as GPS, which also detects the height of the compacting vehicle 28 in order to measure the thickness of the silage layer in combination with the detected height of a pusher blade or the like used when distributing the silage 16.

The results of the steps 104, 106 and 110 are processed in step 108, in order to determine therein a tire pressure for the front and rear wheels 40, 42 suitable for the compacting of the harvested crops to be attained or—if a compacting device 36 is present which may be identified by a user input in the user interface 48 or an automatic recognition of the compacting device 36, whether by a camera or an electronic identification of the compacting device 36, for example, via a bus system or a wireless transmission (for example, RFID or the like)—to fix a measured contact force of the compacting device 36, which serves for setting the actuator 56. To this end, the actuator 56 would have to be designed as dual-acting in order to permit the lower link arm to be pulled downwardly. Moreover, the upper link arm of the three-point hitch may be designed as an actuator 56 in order to be able to push down the compacting device 36 using the upper link arm. In this case, the rear wheels 42 would be relieved of load and the contact force of the compacting device 36 increased if the upper link arm were extended by the actuator 56. Similarly, the same may also be carried out with the lower link arms in order to vary by the actuator 56 their length and thus the contact force of the compacting device 36.

The tire pressure is primarily fixed for the case when no compacting device 36 is present, i.e., the compacting of the silage 16 takes place only by the front and rear wheels 40, 42.

In step 108, it may be determined which pressure has to be at least applied, in particular using the dry mass density to be attained (step 104) and the maximum value of the thickness detected in step 110 of the layer respectively to be compacted. Should it be able to be identified using the data of the compacting vehicle 28 that this pressure may not be attained, a warning may be provided to the user via the user interface 48. In this case, a ballast proposal may also be provided to the user of the compacting vehicle 28 (see EP 3 384 746 A1, the disclosure of which is incorporated herein in its entirety) so that the user may apply a suitable ballast weight to a rear or front interface of the tractor 32.

Based on the results of steps 104 and 110, in step 112 a compacting action to be attained is calculated as a function of the location on the silo 10. This depends amongst other things on the local thickness of the layer to be compacted (known from step 110) and on the density to be attained (known from step 104) and optionally on the measured density of the layer to be compacted. Thus in step 112 is it fixed to which degree (i.e., with which compacting action) the silage 16 has to be compacted in a location-specific manner, i.e., which pressure has to be exerted and for how long at the different positions of the silo 10. In step 112, the thickness of the older, already compacted layer located below the layer of silage 16 to be compacted may also be considered, and to what extent this has been compacted. The horizontal resolution of the compacting action calculated in step 112 may be adapted to the size of the means or mechanism serving for compacting the silage 16 and is thus greater when compacting is carried out only by the front and rear wheels 40, 42 than when compacting is carried out using the compacting tool 36. In particular, the compacting action is determined with a suitable horizontal resolution in the forward and transverse direction along the compacting paths 30, which are able to be planned in advance in a manner known per se with the known dimensions of the compacting vehicle 28 or of the compacting device 36 and of the silo 10. The dimensions of the silo 10 and the position thereof may be manually input, read from a map or determined by being traveled over, with simultaneous position detection.

Additionally, in step 112 it may be considered which form the silage 16 is ultimately intended to have, i.e., which gradient the end regions of the silage 16 in the silo 10 and the middle thereof are intended to have in the transverse or longitudinal direction. These values may be input at the start via the user interface 48. These values may also be already considered when distributing the silage 16 and transmitted electronically from the distribution vehicle to the compacting vehicle 28.

In the following step 114, by using the location-specific compacting action calculated in step 112, the control device 46 creates a map in which for the silo 10 an input is made in a location-specific manner relative to which velocity v the compacting vehicle 28 is intended to move. In this case, limits to the velocity which are fixedly predetermined or settable by the user via the user interface 48 are considered. In particular, if a user should be in the cab 50 during the compacting process, the acceleration may also be kept within specific limits dictated by comfort. The map may contain the pressure p to be applied, which is able to be set by the tire pressure regulator 54 (in the case of compacting by the front and rear wheels 40, 42) or the actuator 56 (in the case of compacting by the compacting tool 36), or associated predetermined values for the tire pressure regulator 54 or the actuator 56. The velocity v or the pressure p to be attained (or the associated setting of the tire pressure regulator 54 or the actuator 56) are calculated in step 114 (by considering the aforementioned boundary conditions for velocity and acceleration, for which a model-based control with a cost function may be used for considering the boundary conditions, see EP 3 348 130 A1 and references cited therein) such that the compacting action calculated in step 112 is attained. Additionally, the map may contain the number of intended passes of the compacting vehicle 28 along the respective compacting paths 30.

In this case, the predetermined values for the velocity v or the pressure p to be attained (or the associated setting of the tire pressure regulator 54 or the actuator 56) may remain the same or be varied for the same traveled path 30, i.e., may be successively larger or smaller for successive passes. This may be already planned in advance or may be implemented as a reaction to a measurement of the compacting attained. For example, when a specific traveled path 30 is first covered, initially a relatively large compacting action may be selected and this may be reduced when the same traveled path 30 is covered for a second time (or vice versa).

In the following step 116, the compacting of the silage 16 is carried out by the compacting vehicle 28. The compacting vehicle is moved along the compacting paths 30, whether manually by the user to which instructions are provided from the control device 46 via the user interface 48 as to how the driver should steer and how fast the driver should travel, or automatically by the control device 46 by corresponding activation of the steering and speed control device 52. The steering along the compacting paths 30 takes place, in particular, using the signals of the position determining system 60. In step 116, as described above, each of the compacting paths 30 may be traveled over repeatedly, or initially different compacting paths 30 are traveled over once or repeatedly one after the other, in order not to bore the user (insofar as the driver is located in the cab 50 during the compacting process). In step 116 the velocity or the pressure along the compacting path respectively traveled over is locally adapted to the values determined in step 114. In other words, when the velocity of the compacting vehicle 28 deviates by more than a specific threshold value from the target value of step 114 for the respective position on the silo 10, the compacting vehicle 28 is accelerated or decelerated. Similarly, the actuator 56 or the tire pressure regulator 54 is directly commanded by the control device 46 or commanded by a user according to a corresponding instruction via the user interface 48 to adapt the respective setting to the predetermined value of step 114. In step 116 accordingly the compacting of the silage 16 is carried out with a variable compacting action along the compacting path 30.

During the compacting (step 116) in step 118, the progress of the compacting is detected. To this end, the sensor 58 which detects to which extent the layer of the silage 16 is gradually compacted along the compacting path 30 may be used. This data may also be obtained by a measurement of the vertical height of the compacting vehicle 28 (above sea level) using the position determining system 60. A density measurement made by the sensor 58 may also be carried out in step 118. In a further embodiment, the measurement of the attained alteration to the thickness or density may be dispensed with and the progress determined using the number of covered traveled paths 30 and optionally the associated working parameters during the compacting (velocity v and pressure p).

In the following step 120, it is tested whether the desired compacting for the entire silo 10 has been attained. If in step 118 the values of the sensor 58 or the vertical height of the compacting vehicle 28 are detected, this testing make be carried out using a comparison of the density derived (i.e., measured) from the detected values with the target density of step 104. Moreover, in particular when eliminating the measurement of the attained alteration to the thickness or density, in step 120 it is tested whether the number of passes for all compacting paths 30 determined in step 114 has been carried out. If the desired compacting has been already attained, the process in step 122 is terminated. Subsequently a new layer of silage 16 may be distributed on the silo 10 and step 100 is started again, or when no more harvested crops have to be applied, the silage 10 is covered over.

If in step 120 it results that the desired compacting is not yet attained for the entire silo, step 112 follows again. In this step 112, with the second, third, etc., recall the location-specific compacting action to be applied may be updated in order to consider in a location-specific manner the compacting of the silage 10 which has changed in the meantime. At sufficiently compacted points, therefore, the compacting action to be applied is set to zero, and compacting paths 30 where a sufficient compacting has been attained over the entire length thereof are identified as "finished" and in the following steps 114 to 118 no longer considered or traveled over.

In step 112, it may be further analyzed whether the settings used in step 114 (velocity or tire pressure or contact force of the compacting tool 36) have led to an anticipated result of the compacting, since the latter (as long as the measurement of the attained alteration to the thickness or density is not dispensed with) is known from step 118. If required, therefore, in step 112 a correction of the compacting action may be made. In this case, it is a system with a closed feedback loop, which in a self-teaching manner reacts to the compacting action attained thereby.

When carrying out the compacting a map in which the status of the compacting or the passes yet to be carried out over the silo 10 may be displayed to the user of the compacting vehicle 28 via the user interface 48. With an automation of the compacting tool 28, the user thereof may leave the compacting tool—at least for the duration of the compacting process. The driver (or any other person) may obtain the map, mentioned in this paragraph, or any other data from the control device 46 on a stationary or mobile computer via a wireless connection to the control device 46, so that the driver is informed about the work progress.

As a result, the method shown of locally varying the compacting action along the compacting paths 30 provides the advantages that locations which are already sufficiently compacted are not processed unnecessarily and that therefore a time and energy saving is present.

While embodiments incorporating the principles of the present disclosure have been disclosed hereinabove, the present disclosure is not limited to the disclosed embodiments. Instead, this application is intended to cover any variations, uses, or adaptations of the disclosure using its general principles. Further, this application is intended to cover such departures from the present disclosure as come within known or customary practice in the art to which this disclosure pertains and which fall within the limits of the appended claims.

The invention claimed is:

1. A compacting vehicle, comprising:
   one or more wheels;
   a chassis supported by the one or more wheels;
   an engine;
   a compacting device for compacting silage in a silo, the compacting device connected to the chassis via an actuator, the compacting device exerting a downward contact force on the silage in the silo, the actuator varying a compacting action by the compacting device; and
   an electronic control device for controlling the compacting vehicle for compacting the silage in the silo;
   wherein the electronic control device operably controls the compacting vehicle to pass over the silage deposited in the silo and operably controls the actuator to locally vary the compacting action of the compacting device in a location-dependent manner as the compacting vehicle travels along a compacting path;
   wherein, in advance of a travel of the compacting vehicle, the electronic control device predetermines, for each of a plurality of different locations, a variance for the compacting action in the location-dependent manner; and
   wherein the compacting device comprises a roller extending more than a width of the compacting vehicle.

2. The compacting vehicle as claimed in claim 1, wherein the compacting device is removably coupled to the compacting vehicle via a three-point hitch.

3. The compacting vehicle as claimed in claim 1, further comprising a user interface disposed in communication with the electronic control device.

4. The compacting vehicle as claimed in claim 1, wherein the electronic control device is operably coupled to a steering and speed control device and a tire pressure regulator.

5. The compacting vehicle as claimed in claim 1, wherein the actuator is dual-acting and exerts a downward force on the compacting device via an upper link arm of a three-point hitch, which increases the compacting action of the compacting device and relieves a load on the one or more wheels of the compacting vehicle.

6. The compacting vehicle as claimed in claim 1, wherein the electronic control device is configured to predetermine the variance for the compacting action and a duration the variance is to be applied in the location-dependent manner.

7. The compacting vehicle as claimed in claim 1, wherein the electronic control device is configured to create a map containing, for each of the plurality of different locations, a predetermined pressure value, and wherein the control device is further configured to control, as the compacting vehicle travels along the compacting path, the actuator to locally adapt the downward contact force to the predetermined pressure value.

* * * * *